United States Patent [19]

Doi

[11] Patent Number: 5,238,972
[45] Date of Patent: Aug. 24, 1993

[54] HEAT-RESISTANT FOAMED PLASTIC

[75] Inventor: Toru Doi, Yokkaichi, Japan

[73] Assignee: Tosoh Corporation, Yamaguchi, Japan

[21] Appl. No.: 952,441

[22] Filed: Sep. 29, 1992

[30] Foreign Application Priority Data

Oct. 2, 1991 [JP] Japan .................................. 3-280300

[51] Int. Cl.$^5$ .................................................. C08J 9/10
[52] U.S. Cl. .................................... 521/142; 521/189; 526/262
[58] Field of Search ................. 521/142, 189; 526/262

[56] References Cited

U.S. PATENT DOCUMENTS

| | | | |
|---|---|---|---|
| 4,120,923 | 10/1978 | Kloker et al. | 521/138 |
| 4,525,536 | 6/1985 | Ikuma et al. | 525/194 |
| 4,609,711 | 9/1986 | Younes | 525/186 |
| 4,625,004 | 11/1986 | Younes | 521/146 |
| 4,661,574 | 4/1987 | Younes | 521/147 |
| 4,771,080 | 9/1988 | Ibuki et al. | 521/56 |
| 5,137,933 | 8/1992 | Hiromoto et al. | 521/139 |

FOREIGN PATENT DOCUMENTS 0274410  7/1988  European Pat. Off. .
2122625A 1/1984  United Kingdom .

*Primary Examiner*—Morton Foelak
*Attorney, Agent, or Firm*—Nixon & Vanderhye

[57] ABSTRACT

A foamed plastic is provided which is excellent in heat resistance and mechanical strength. The foamed plastic is produced by foaming a resin which comprises an N-alkyl-substituted maleimide unit in an amount of 30 to 98 mol % and an olefin unit in an amount of 70 to 2 mol % of the entire polymer, and has a weight-average molecular weight of from $1 \times 10^3$ to $5 \times 10^6$ in terms of polystrene.

6 Claims, No Drawings

HEAT-RESISTANT FOAMED PLASTIC

BACKGROUND OF THE INVENTION

1. Field of the Invention

The present invention relates to a foamed plastic comprising a copolymer of an N-alkyl-substituted maleimide and an olefin, and having high heat-resistance and high mechanical strength.

2. Description of the Related Art

Foamed plastics are used conventionally in a variety of application fields including trays, containers and the like in foodstuff packaging fields; heat-insulating materials, cushioning materials and the like in the fields of building-construction, industrial production, and commercial distribution.

The raw materials used usually for the foamed plastics include polystyrene, acrylic resins, polyvinyl chloride, and polyethylene. The foamed plastics made from the raw materials, however, are limited in the application field thereof because of insufficiency of heat-resistance, chemical resistance, mechanical strength, and so forth.

In the field of foodstuff, for example, the above-mentioned materials are not satisfactory for food containers for electronic range cooking in view of their insufficient heat-resistance. Further, the above-mentioned materials are not satisfactory for heat insulating material for automobile ceilings, roofs, steam piping, hot water piping, and so forth owing to the low heat resistance.

The inventors of the present invention made comprehensive study to solve the above problems, and have found that a foamed plastic constituted of a specified copolymer of an N-alkyl-substituted maleimide and an olefin is satisfactory for the above object.

SUMMARY OF THE INVENTION

The present invention intends to provide a foamed plastic excellent in heat resistance, mechanical strength, and so forth.

The present invention provides a foamed plastic produced by foaming a resin which comprises a first component represented by formula (I) at a content of 30 to 98 mol % and a second component represented by formula (II) at a content of 70 to 2 mol % of the entire polymer, and has a weight-average molecular weight of from $1 \times 10^3$ to $5 \times 10^6$:

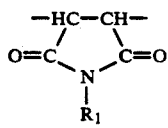  (I)

where $R_1$ is an alkyl group of 1 to 18 carbons or a cycloalkyl group of 3 to 12 carbons,

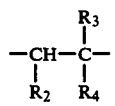  (II)

where $R_2$ is hydrogen or an alkyl group of 1 to 8 carbons, and $R_3$ and $R_4$ are respectively an alkyl group of 1 to 8 carbons.

The resin for constituting the foamed plastic of the present invention may be prepared, for example, by radical polymerization of an N-alkyl-substituted maleimide and an olefin.

The compounds which give the N-alkyl-substitute maleimide of the component (I) include N-methylmaleimide, N-ethylmaleimide, N-n-propylmaleimide, N-isopropylmaleimide, N-n-butylmaleimide, N-isobutylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclopropylmaleimide, N-cyclobutylmaleimide, N-cyclohexylmaleimide, and the like. Among them, N-methylmaleimide, N-ethylmaleimide, N-isopropylmaleimide, and N-cyclohexylmaleimide are preferred. The substituted maleimide may be used singly or in combination of two or more thereof.

The compounds which give the olefin of the component (II) include isobutene, 2-methyl-1-butene, 2-methyl-1-pentene, 2-methyl-1-hexene, 1-methyl-1-heptene, 1-isooctene, 2-methyl-1-octene, 2-ethyl-1-pentene, 2-methyl-2-butene, 2-methyl-2-pentene, 2-methyl-2-hexene, and the like. Among them, isobutene is preferred. These olefins may be used singly or in combination of two or more thereof.

The component (I) is contained at a content of from 30 to 98 mol %, preferably from 40 to 75 mol %, more preferably from 50 to 70 mol % of the entire polymer. At a content thereof higher than 98 mol %, the resulting polymer is brittle and is not preferred. At a content thereof less than 30 mol %, the polymer has lower heat-resistance, and is not preferred.

Another monomer may be copolymerized within a range in which the object of the present invention is not prevented. Such monomer includes styrene, α-methylstyrene, vinyltoluene, 1,3-butadiene, isoprene, and halogen-substituted derivatives of these monomers; methacrylates such as methyl methacrylate, ethyl methacrylate, cyclohexyl methacrylate, phenyl methacrylate, and benzyl methacrylate; acrylates such as methyl acrylate, ethyl acrylate, butyl acrylate, cyclohexyl acrylate, phenyl acrylate, and benzyl acrylate; vinyl esters such as vinyl acetate, and vinyl benzoate; vinyl ethers such as methyl vinyl ether, ethyl vinyl ether, propyl vinyl ether, and butyl vinyl ether; vinyl chloride, vinylidene chloride, maleic anhydride, N-phenylmaleimide, N-carboxyphenylmaleimide, acrylonitrile, ethylene, propylene, 1-butene, 2-butene, and 1-hexene, and combination of two or more of the above monomers.

These monomers may be copolymerized by any known polymerization process such as bulk polymerization, solution polymerization, suspension polymerization, and emulsion polymerization.

The initiator for the polymerization includes organic peroxides such as benzoyl peroxide, lauryl peroxide, octanoyl peroxide, acetyl preoxide, di-t-butyl peroxide, t-butyl cumyl peroxide, dicumyl peroxide, t-butylperoxy acetate, and t-butylperoxy benzoate; and azo type initiators such as 2,2'-azobis(2,4-dimethylvaleronitrile), 2,2'-azobis(2-butyronitrile), 2,2'-azobisisobutyronitrile, dimethyl-2,2'-azobisisobutyrate, and 1,1'-azobis(cyclohexane-1-carbonitrile).

The solvent useful for the solution polymerization includes benzene, toluene, xylene, ethylbenzene, cyclohexane, dioxane, tetrahydrofuran, acetone, methyl ethyl ketone, dimethylformamide, isopropyl alcohol, butyl alcohol, and so forth.

The temperature of the polymerization is selected suitably depending on the decomposition temperature of the initiator. Generally the temperature is preferably in a range of from 40° to 150° C.

The above-mentioned resin of the present invention may also be prepare by copolymerizing maleic anhydride and an olefin and subsequently imidizing the resulting copolymer. Such post-imidization reaction may be conducted, for example, by dissolving or dispersing maleic anhydride-isobutene copolymer in an alcohol such as methanol, ethanol, and propanol, or in an aromatic solvent such as benzene, and toluene, and reacting a primary amine like methylamine with the copolymer at a temperature of from 100° to 350° C.

The weight-average molecular weight (Mw) of the resulting resin can be determined by gel permeation chromatography (GPC). The molecular weight of the resin of the foamed plastic is preferably in a range of from $1 \times 10^3$ to $5 \times 10^6$, more preferably from $1 \times 10^5$ to $1 \times 10^6$. The polymer having a molecular weight of higher than $5 \times 10^6$ tends to have low moldability, and a polymer having molecular weight lower than $1 \times 10^3$ tends to give a brittle foamed plastic.

The resin of the present invention may further contain, if necessary, a dye, an organic or inorganic particulate material, a heat stabilizer such as a hindered phenol and an organic phosphate ester, a UV stabilizer such as a benzotriazole and a hindered amine, a blow-assisting agent, an antistatic agent, a lubricant or the like.

The resin may further be mixed with another resin, rubber or the like. The resin may be a graft copolymer prepared by copolymerization in the presence of a rubbery polymer.

The foamed plastic of the present invention can be produced by using the aforementioned resin by a known foaming process. For example, a blowing agent is impregnated into or blended with the resin, and the mixture is heated in a mold. The blowing agent includes volatile blowing agents such as fluorotrichlorocarbon, dichlorodifluorocarbon, propane, butane, and carbon dioxide, and a decomposition blowing agent such as sodium hydrogencarbonate, azodicarbonamide, N,N'-dinitrosopentamethylenetetramine, terephthalazide, 5-phenyltetrazole and p-toluenesulfonyl semicarbazide.

Otherwise, the foamed plastic can be produced by use of the above blowing agent by extrusion-foaming molding, injection-foaming molding, or the like molding process.

The blowing ratio of the foamed plastic of the present invention is preferably in a range of from 1.1 to 100. The blowing ratio exceeding 100 is not desirable because the mechanical properties such as the compression strength and the bending strength power. Within the range, the resin is readily worked into various molded articles, sheets, films, laminates, and the like, and the resulting foamed plastic can be secondarily worked into various containers by vacuum molding or the like process.

The foamed plastic of the present invention is excellent in heat resistance, chemical resistance, mechanical characteristics, electrical characteristics, X-ray transmission, and so forth, and is suitable for uses for food containers such as cups, trays, and particularly containers for electronic range cooking; leisure and sports equipment such as skis and tennis rackets; structural materials for helicopters and aircrafts; automobile parts; ship parts for boats, yacht and the like; electric and electronic parts; medical parts, and so forth.

The present invention is described by reference to Examples without limiting the invention in any way.

The molecular weight of the resulting polymer was determined by GPC (HLC-802A, made by Tosoh Corporation) in terms of polystyrene.

REFERENCE EXAMPLE 1

In a 50 liter autoclave equipped with a stirrer, a nitrogen-introducing tube, a thermometer, and a degassing tube, there were charged 2780 g (25 mole) of N-methylmaleimide, 3.2 g (0.02 mol) of 2,2'-azobisisobutyronitrile (AIBN), and 40 l of dioxane. The autoclave was purged with nitrogen several times, and 2805 g (50 mol) of isobutene was charged thereto. The reaction was allowed to proceed at 60° C. for 12 hours. The reaction mixture was poured into ethanol to precipitate the resulting polymer. The polymer was purified by reprecipitation in dioxane-methanol, and dried at a reduced pressure at 60° C. for 24 hours. The yield of the polymer was 4030 g.

The obtained polymer contained the maleimide unit at a content of 50 mol % from elemental analysis of the polymer (C: 64.7 wt %, H: 7.8 wt %, and N: 8.4 wt %), and had a molecular weight (Mw) of 223000.

REFERENCE EXAMPLE 2

An N-isopropylmaleimide-isobutene copolymer was synthesized in the same manner as in Reference Example 1 except that N-isopropylmaleimide was used in place of N-methylmaleimide.

The obtained polymer contained the maleimide unit at a content of 50 mol % from elemental analysis of the polymer, and had a molecular weight (Mw) of 181000.

REFERENCE EXAMPLE 3

An N-cyclohexylmaleimide-isobutene copolymer was synthesized in the same manner as in Reference Example 1 except that N-cyclohexylmaleimide was used in place of N-methylmaleimide.

The obtained polymer contained the maleimide unit at a content of 51 mol % from elemental analysis of the polymer, and had a molecular weight (Mw) of 172000.

EXAMPLES 1 TO 3

To 100 parts by weight of the resin prepared in Reference Examples 1 to 3, respectively, 5 parts by weight of 5-phenyltetrazole was added as a blowing agent, and the mixture was fed to an extrusion molding machine, and melt-blended at the cylinder temperatures of from 220° to 320° C. and was extruded from a T die to prepare a foamed plastic.

The resulting polymers were tested for bulk density according to ASTM D-1622, compression strength according to ASTM D1621, flexural strength according to ASTM D790, and heat resisting temperature according to ASTM D648. The properties of the obtained foamed polymers are shown in Table 1.

COMPARATIVE EXAMPLES 1 TO 3

For comparison, foamed plastics were prepared by use of Denka Styrol (polystyrene resin, made by Denki Kagaku Kogyo K. K.), Acrypet (acrylic resin, made by Mitsubishi Rayon Co., Ltd.), or Ryuron (vinyl chloride resin, made by Tosoh Corporation) in the same manner as in Examples. The properties of the obtained polymer are shown in Table 1.

TABLE 1

| Sample | Heat-distortion temperature (°C.) | Compression strength (kg/cm$^2$) | Flexural strength (kg/cm$^2$) | Bulk density (g/cm$^3$) |
| --- | --- | --- | --- | --- |
| Example | | | | |
| 1 | 155 | 45 | 57 | 0.101 |
| 2 | 145 | 40 | 52 | 0.100 |
| 3 | 180 | 40 | 48 | 0.102 |
| Comparative Example | | | | |
| 1 | 70 | 12 | 18 | 0.098 |
| 2 | 85 | 20 | 25 | 0.110 |
| 3 | 75 | 15 | 22 | 0.100 |

As understood from the Examples, the foamed plastic of the present invention is superior in heat resistance, mechanical properties, and so forth, and is suitable for uses for a variety of application fields such as food containers, building materials, industrial parts, commerce distribution materials, leisure and sports parts, aircraft parts, automobile parts, ship parts, electric and electronic parts, and medical parts.

What is claimed is:

1. A heat resistant foamed plastic produced by foaming a resin, which foamed plastic comprises a first component in an amount of 30 to 98 mol % having the formula:

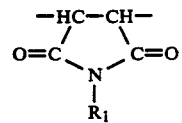

where $R_1$ is an alkyl group of 1 to 18 carbons or a cycloalkyl group of 3 to 12 carbons, and
a second component in an amount of 70 to 2 mol % of the entire polymer having the formula:

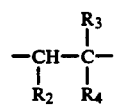

where $R_2$ is hydrogen or an alkyl group of 1 to 8 carbons, and $R_3$ and $R_4$ are each alkyl groups of 1 to 8 carbons
said heat resistant foamed plastic having a weight average molecular weight of from $1 \times 10^3$ to $5 \times 10^6$.

2. The foamed plastic according to claim 1, wherein the first component is selected from the group consisting of N-methylmaleimide, N-ethylmaleimide, N-isopropylmaleimide, and N-cyclohexylmaleimide.

3. The foamed plastic according to claim 1, wherein the second component is isobutene.

4. The foamed plastic according to claim 1, wherein the first component is 50 to 70 mol % of the entire polymer.

5. The foamed plastic according to claim 1, having a weight-average molecular weight of from $1 \times 10^5$ to $1 \times 10^5$.

6. The foamed plastic according to claim 1, in which the foaming ratio is from 1:1 to 1:100.

* * * * *